(12) United States Patent
Goupil

(10) Patent No.: US 10,364,031 B2
(45) Date of Patent: Jul. 30, 2019

(54) TOUCHSCREEN TABLET COMPUTING DEVICE SUPPORT

(71) Applicant: Bernard Goupil, Verdun (CA)

(72) Inventor: Bernard Goupil, Verdun (CA)

(73) Assignee: ATLAS DIVERTISSEMENT INC., Verdun, Quebec (CA)

( * ) Notice: Subject to any disclaimer, the term of this patent is extended or adjusted under 35 U.S.C. 154(b) by 34 days.

(21) Appl. No.: 15/563,233

(22) PCT Filed: Apr. 4, 2016

(86) PCT No.: PCT/CA2016/000102
§ 371 (c)(1),
(2) Date: Sep. 29, 2017

(87) PCT Pub. No.: WO2016/154731
PCT Pub. Date: Oct. 6, 2016

(65) Prior Publication Data
US 2018/0086466 A1    Mar. 29, 2018

Related U.S. Application Data

(60) Provisional application No. 62/142,247, filed on Apr. 2, 2015.

(51) Int. Cl.
| | |
|---|---|
| *B64D 11/00* | (2006.01) |
| *F16M 13/02* | (2006.01) |
| *G06F 3/041* | (2006.01) |
| *F16M 11/04* | (2006.01) |
| *F16M 13/00* | (2006.01) |

(52) U.S. Cl.
CPC ..... *B64D 11/00152* (2014.12); *F16M 11/041* (2013.01); *F16M 13/00* (2013.01); *F16M 13/02* (2013.01); *G06F 3/0412* (2013.01)

(58) Field of Classification Search
None
See application file for complete search history.

(56) References Cited

U.S. PATENT DOCUMENTS

| | | | |
|---|---|---|---|
| 6,021,720 A * | 2/2000 | Boos ............... | B60N 3/001 108/152 |
| 7,422,379 B2 * | 9/2008 | Agevik ............ | F16M 11/041 206/316.2 |

(Continued)

OTHER PUBLICATIONS

The International Search Report dated Jul. 6, 2016; PCT/CA2016/000102.

*Primary Examiner* — Xanthia C Cunningham
(74) *Attorney, Agent, or Firm* — Ladas & Parry LLP

(57) ABSTRACT

A tablet computing device support for use by a user seated on an airplane behind a seat having a folding table. The tablet computing device support comprises a main body, a bottom support element positioned at a bottom end of the main body, at least two lateral support members positioned on opposite sides of the main body, each of the at least two lateral support members including a lateral support element, and at least one securing member configured to be inserted between the folding table in the upright position and the seat in front of the user. The bottom support element and the at least two lateral support elements are configured to receive therebetween and secure a tablet computing device to the tablet computing device support.

17 Claims, 5 Drawing Sheets

(56) References Cited

U.S. PATENT DOCUMENTS

| | | | |
|---|---|---|---|
| 7,611,112 B2* | 11/2009 | Lin | B60R 11/02 248/274.1 |
| 8,210,605 B2 | 7/2012 | Hough et al. | |
| 8,851,565 B2 | 10/2014 | Hontz et al. | |
| 8,864,089 B2* | 10/2014 | Hung | F16M 11/041 248/122.1 |
| 9,062,821 B2* | 6/2015 | Jensen | F16M 11/041 |
| 9,103,492 B2* | 8/2015 | Springer | F16M 11/041 |
| 9,156,555 B2* | 10/2015 | Shih | B64D 11/06 |
| 9,288,920 B1* | 3/2016 | Steiner | F16M 11/38 |
| 9,452,839 B2* | 9/2016 | Chatrenet | B64D 43/00 |
| 9,661,767 B2* | 5/2017 | Danicich | B60R 11/00 |
| 2005/0178297 A1* | 8/2005 | Pipkin | A47B 23/00 108/25 |
| 2007/0283855 A1* | 12/2007 | Pozzi | A47B 23/043 108/44 |
| 2012/0001045 A1* | 1/2012 | Wang | F16M 11/10 248/281.11 |
| 2012/0068504 A1* | 3/2012 | Ting | B60R 11/0235 297/135 |
| 2013/0039349 A1 | 2/2013 | Ebrahimi Tazeh Mahalleh et al. | |
| 2013/0070171 A1* | 3/2013 | Boyer, Jr. | H04N 5/655 348/837 |
| 2013/0093220 A1* | 4/2013 | Pajic | B64D 11/0015 297/163 |
| 2013/0270850 A1* | 10/2013 | Fan | A45F 5/00 294/137 |
| 2013/0277520 A1* | 10/2013 | Funk | F16M 13/02 248/274.1 |
| 2014/0048662 A1* | 2/2014 | Ferris | F16M 13/02 248/205.1 |
| 2015/0329062 A1* | 11/2015 | Ackeret | B60R 11/02 248/220.22 |
| 2016/0159480 A1* | 6/2016 | Barth | B64D 11/0015 248/218.4 |
| 2016/0270526 A1* | 9/2016 | Siemer | F16M 11/38 |
| 2016/0298808 A1* | 10/2016 | Boyer | F16M 13/022 |
| 2017/0000250 A1* | 1/2017 | Carnevali | A45F 5/10 |

* cited by examiner

200~# TOUCHSCREEN TABLET COMPUTING DEVICE SUPPORT

CROSS-REFERENCE TO RELATED APPLICATIONS

This application claims the benefits of U.S. provisional patent application No. 62/142,247 filed on Apr. 2, 2015, which is herein incorporated by reference.

TECHNICAL FIELD

The present disclosure relates to a touchscreen tablet computing device support. More specifically, the present disclosure relates to an IPad™ support to be used on an airplane.

BACKGROUND

Touchscreen tablet computing devices have large screens facilitating users' browsing web pages, watching movies and the like.

Users commonly hold the touchscreen tablet computing devices in their hands or rest them on desktops or other flat surfaces. However, doing so for watching movies or perform long-hour work oftentimes causes sore hands. Although putting the touchscreen tablet computing device on desktops or other flat surfaces can get rid of the issue of sore hands, the tradeoff is the neck discomfort, such as pain, stiffness and the like, when users need to bow their heads for a long time to watch the screens of the or other flat surfaces. This is especially true when traveling in an airplane where a passenger is required to stay seated for extended periods of time and only has a small folding table to rest the touchscreen tablet computing device on.

Accordingly, there is a need for a touchscreen tablet computing device support that alleviates those disadvantages and can especially be used while traveling in an airplane.

SUMMARY

The present disclosure provides a tablet computing device support for use by a user seated on an airplane behind a seat having a folding table, comprising:
  a main body;
  a bottom support element positioned at a bottom end of the main body;
  at least two lateral support members positioned on opposite sides of the main body, each of the at least two lateral support members including a lateral support element; and
  at least one securing member configured to be inserted between the folding table in the upright position and the seat in front of the user in order to secure the tablet computing device support to the folding table;
  wherein the bottom support element and the at least two lateral support elements are configured to receive therebetween and secure a tablet computing device to the tablet computing device support.

The present disclosure also provides a tablet computing device support as described above, comprising at least two securing members, each of the at least two securing members being connected to an associated one of the at least two lateral support members.

The present disclosure further provides a tablet computing device support as described above, wherein each of the at least two lateral support members is composed of two slidingly engaged proximal and distal sections, the proximal section being connected to the main body at one end and engaging the distal section at an opposed end, the distal section being provided with the lateral support element at an end opposite the end engaging the proximal section.

The present disclosure further still provides a tablet computing device support as described above, further comprising a spacer mechanism for inclining the tablet computing device support to a desired angle from the vertical so as to adjust a viewing angle of the supported tablet computing device.

BRIEF DESCRIPTION OF THE FIGURES

Embodiments of the disclosure will be described by way of examples only with reference to the accompanying drawings, in which.

Similar references used in different Figures denote similar components.

DETAILED DESCRIPTION

Generally stated, the non-limitative illustrative embodiments of the present disclosure provide a touchscreen tablet computing device support. More specifically, the present disclosure relates to an iPad™ support to be used while seated on an airplane.

Figure 1:
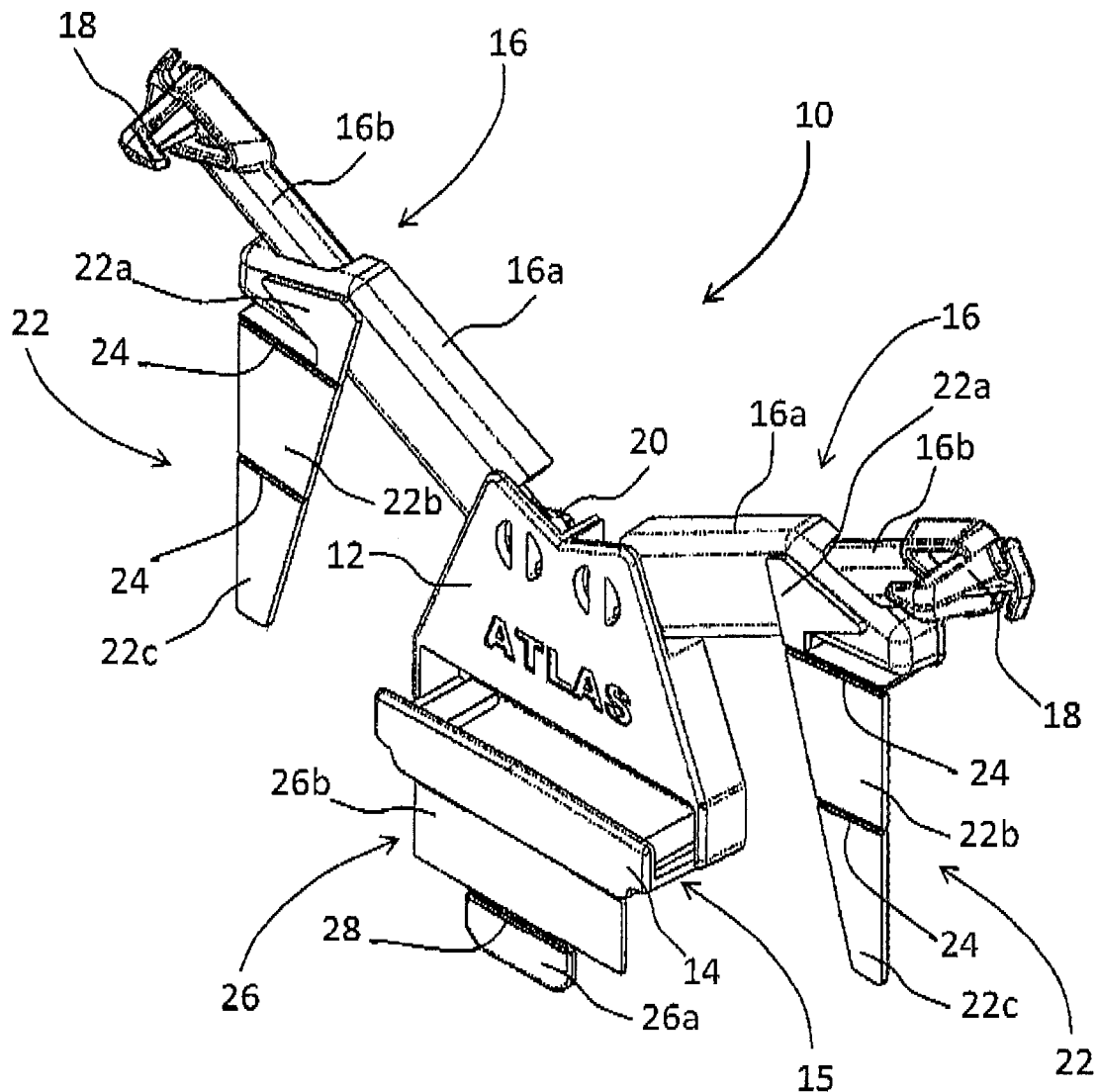
FIG. 1 is an isometric view of a touchscreen tablet computing device support in accordance with an illustrative embodiment of the present disclosure.
Figure 2:
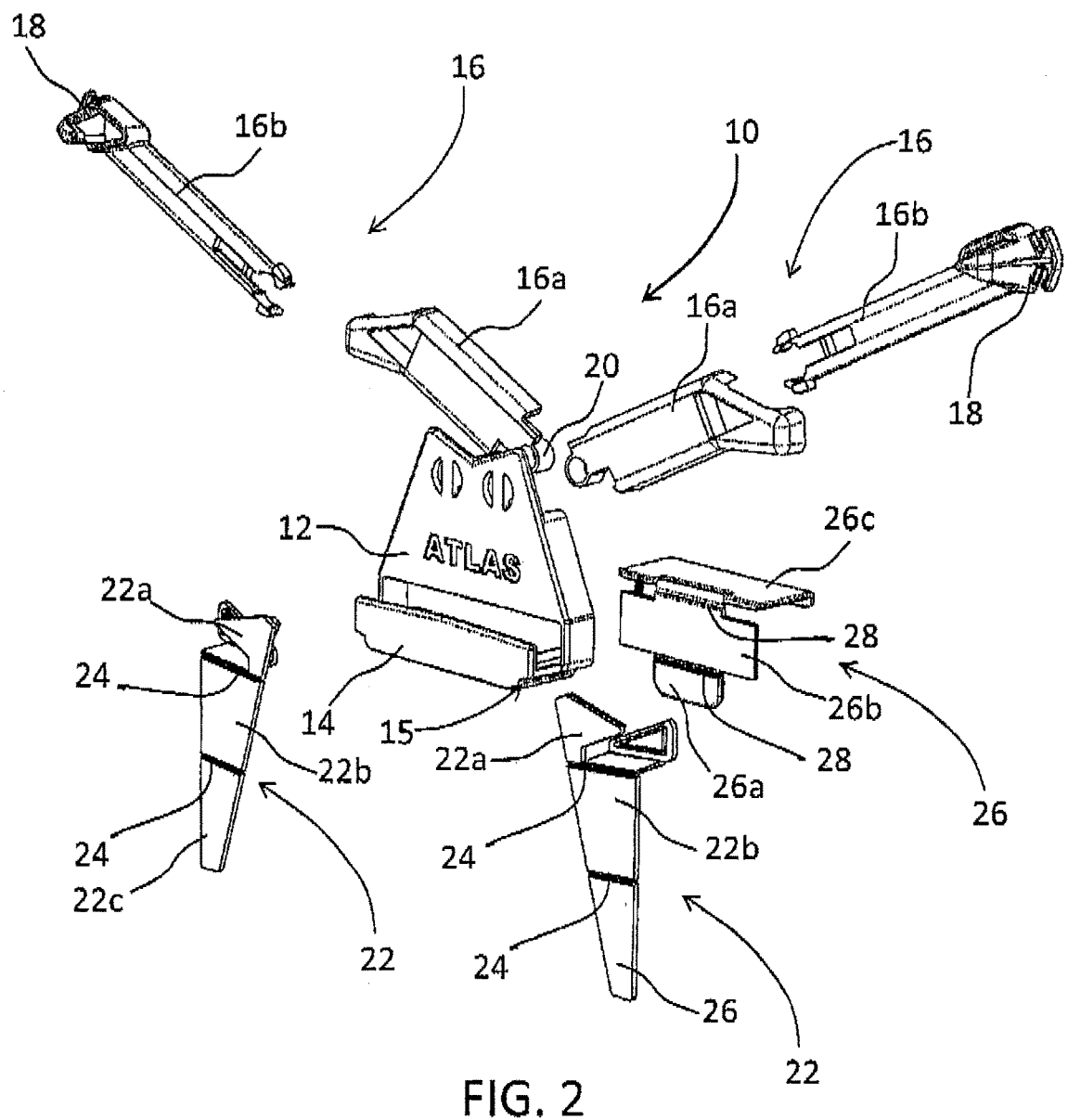
FIG. 2 is an exploded isometric view of the touchscreen tablet computing device support of FIG. 1.
Figure 3:
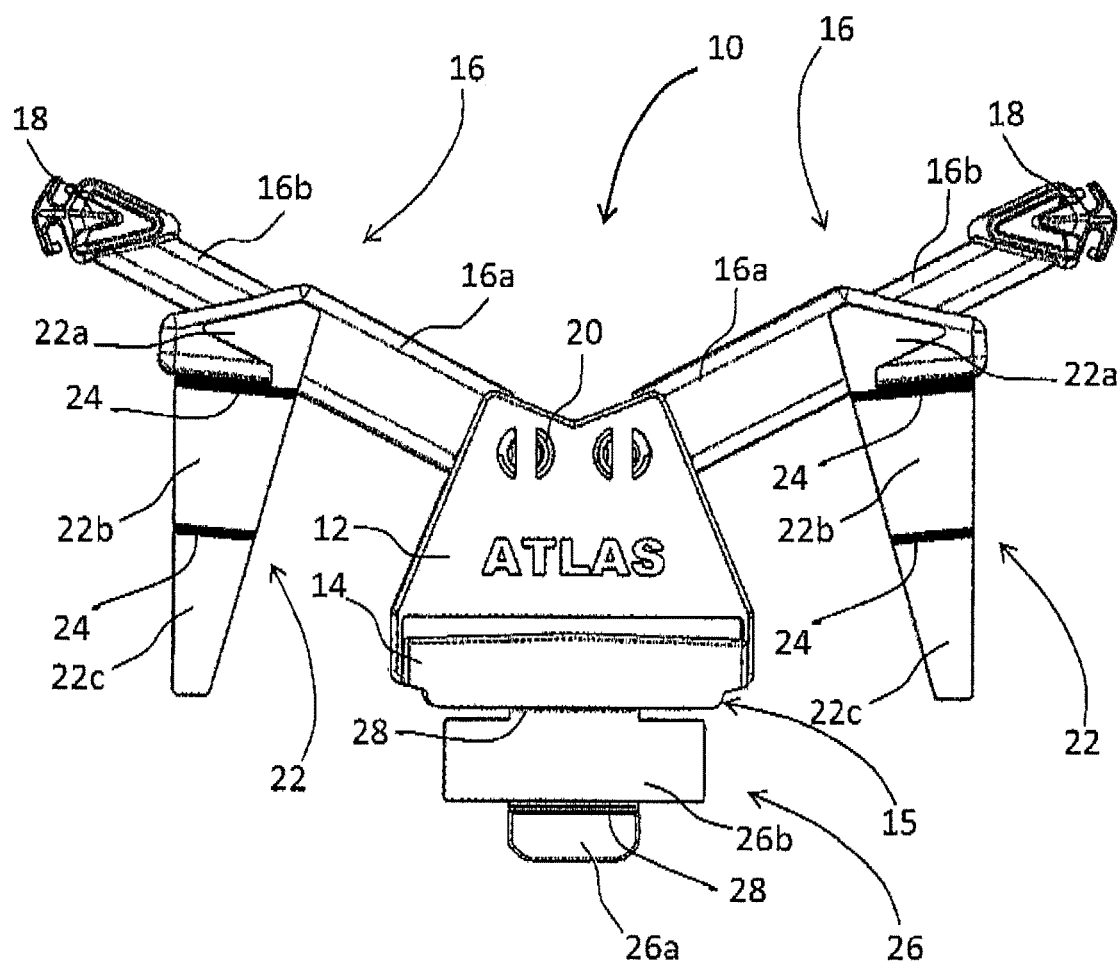
FIG. 3 is a front elevation view of the touchscreen tablet computing device support of FIG. 1.
Figure 4:
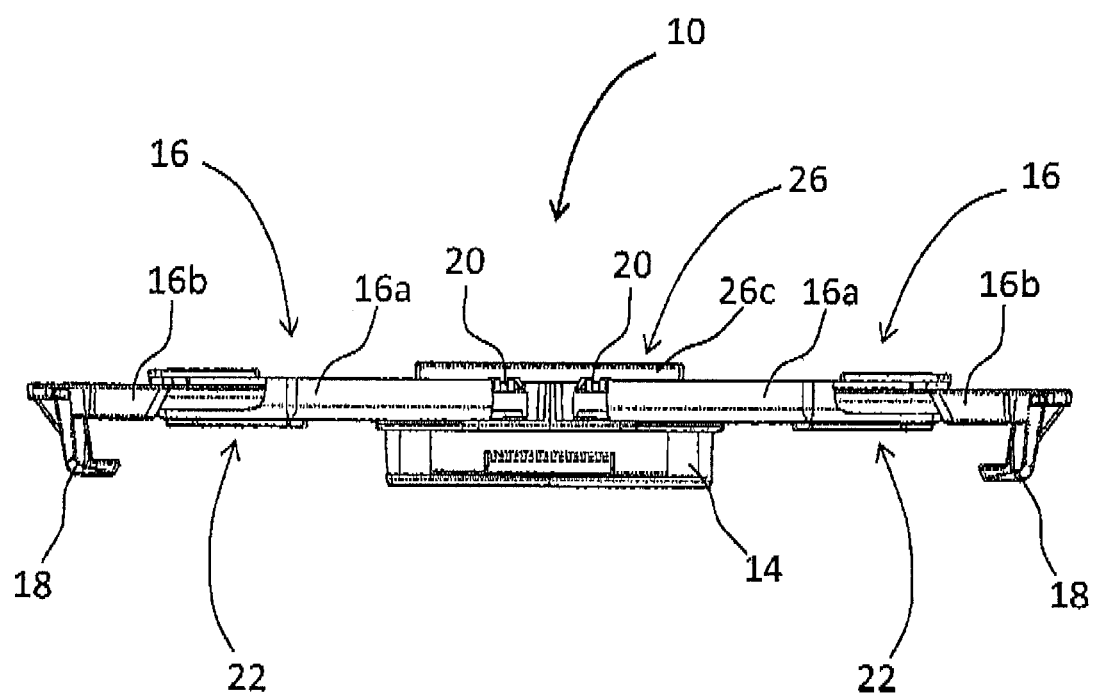
FIG. 4 is a top view of the touchscreen tablet computing device support of FIG. 1.
Figure 5:
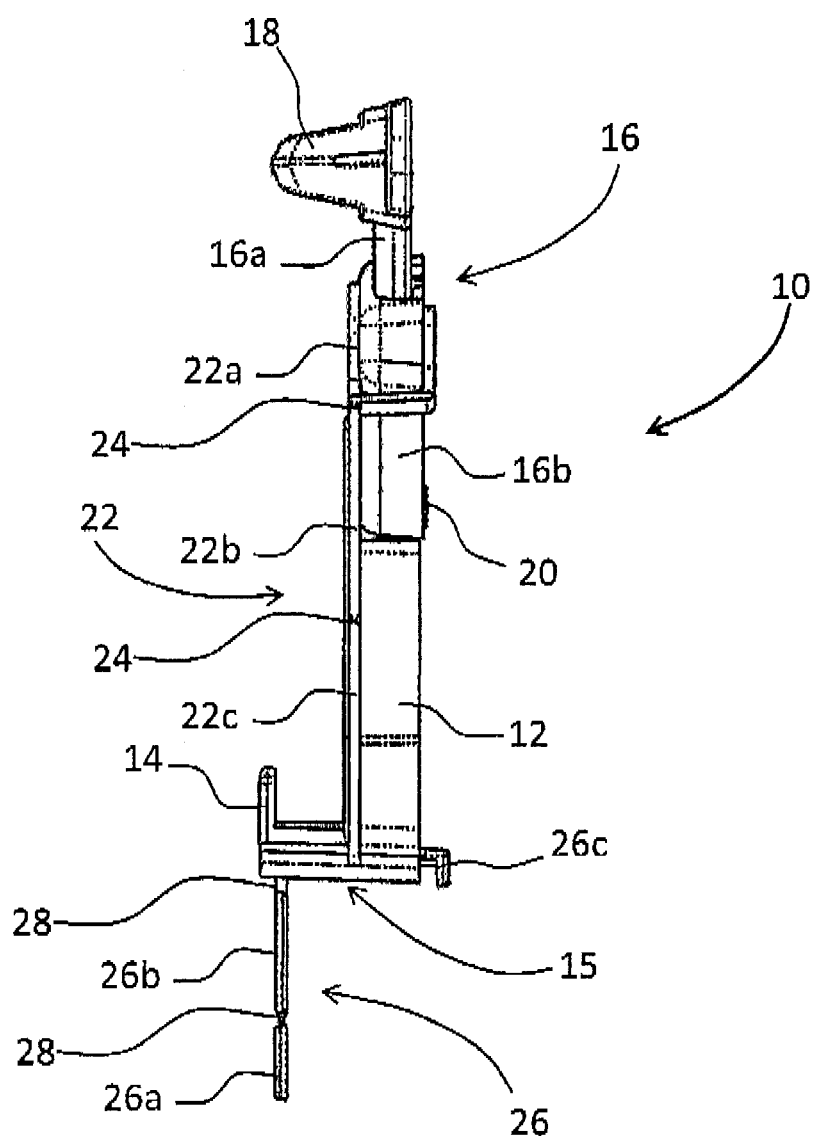
FIG. 5 is a side view of the touchscreen tablet computing device support of FIG. 1.

Referring to FIGS. 1 to 5, there is shown touchscreen tablet computing device support 10 in accordance with an illustrative embodiment of the present disclosure. The tablet support 10 includes a main body 12 having at a bottom end bottom support element 14, lateral support members 16 provided with lateral support elements 18, securing members 22 and spacer mechanism 26.

Each of the lateral support members 16 is composed of two slidingly engaged proximal 16a and distal 16b sections. The proximal section 16a of the lateral support member 16 is operatively connected to the main body 12 of the tablet support 10 via hinge 20 at one end and engaging the distal section 16b of the lateral support member 16 at an opposed end. The distal section 16b of the lateral support member 16 is provided with the lateral support element 18 at an end opposite the one engaging the proximal section 16a of the lateral support member 16. The lateral support members 16 being extendable, this allows the tablet support 10 to accommodate various sizes and/or orientations of touchscreen tablet computing devices. It is to be understood that in alternative embodiments the number of slidingly engageable lateral support member sections 16a, 16b, may vary. The hinges 20 allow adjustment of the positioning of the lateral support members 16, for example to position them in an adjacent folded configuration for storing or transport. It is to be understood that in another alternative embodiment hinges 20 may be omitted. In a further alternative embodiment, the bottom 14 and/or lateral 18 support elements may also be provided with hinges.

Each of the securing members 22, formed by attachment portion 22a and positioning portions 22b, 22c, is made of a non-rigid, pliable, material. The attachment portion 22a is configured to engage an associated lateral support member 16 and secure the securing member 22 thereto. In the illustrative embodiment the attachment portion 22a is configured to engage the proximal section 16a of the lateral support member 16. The attachment portion 22a and positioning portions 22b, 22c are operatively connected by hinges 24, allowing the securing members 22 to take various shapes and configurations. In the illustrative embodiment the hinges 24 are living hinges but it is to be understood that in alternative embodiments other types of hinges may be used, for example mechanical hinges. It is to be understood that in other alternative embodiments the number of securing members 22 and/or positioning sections 22b, 22c may vary. It is also to be understood that in a further alternative embodiment the securing members 22 may each be formed of a single flexible positioning section with an attachment end for securing to the lateral support member 16.

The spacer mechanism 26, formed by handle portion 26a and spacing portions 26b, 26c, is made of a non-rigid, pliable, material. The spacing portions 26b, 26c are configured so as to slidingly engage a bottom portion 15 of the main body 12 in order to protrude from the back of the tablet support 10 so as to insure proper inclination of the tablet support 10. The handle portion 26a and spacing portions 26b, 26c are operatively connected by hinges 28, allowing the alignment of the spacing portions 26b, 26c for sliding into the bottom portion 15 of the main body 12. In the illustrative embodiment the hinges 28 are living hinges but it is to be understood that in alternative embodiments other types of hinges may be used, for example mechanical hinges. It is to be understood that in other alternative embodiments the number of spacing portions 26b, 26c may vary.

In use, the securing members 22 are inserted between the folding table in the upright position and the seat in front of the user. The positioning sections 22b, 22c combined with hinges 24 allow for various table thicknesses. Once the tablet support 10 is positioned, a touchscreen tablet computing device can be inserted in between the bottom 14 and lateral 18 support elements. Hinges 20 ensure proper fitting of the touchscreen tablet computing device into the tablet support 10. The user can then manipulate the handle portion 26a of the spacer mechanism 26 to align the spacing portions 26b, 26c and move them in and out of the bottom portion 15 of the main body 12 resulting in spacing portion 26c abutting the folding table of the seat in front of the user, thus inclining the tablet support 10 to a desired angle from the vertical so as to adjust the viewing angle of the supported touchscreen tablet computing device. This is especially useful when the passenger of the seat in front of the user inclines his or her seat.

In an alternative embodiment, the bottom support element 14 may be extendable. In another alternative embodiment, the main body 12 of the tablet support 10 may be provided with one or more top support members provided with top support elements in replacement, or in addition, to the lateral support members 16 and lateral support elements 18.

The main body 12, bottom support element 14, lateral support members 16 and lateral support elements 18 may be made of rigid polypropylene or polyethylene while the securing members 22 and the spacer mechanism 26 are made of a non-rigid, pliant, material. In an alternative embodiment, the bottom support element 14 and lateral support elements 18 may also be made of a non-rigid, pliant, material and/or the spacer mechanism 26 of a rigid material. In another alternative embodiment, other materials may be used.

Although the present disclosure has been described with a certain degree of particularity and by way of an illustrative embodiments and examples thereof, it is to be understood that the present disclosure is not limited to the features of the embodiments described and illustrated herein, but includes all variations and modifications within the scope and spirit of the present disclosure and as hereinafter claimed.

What is claimed is:

1. A tablet computing device support for use by a user seated on an airplane behind a seat having a folding table, comprising:
   a main body;
   a bottom support element positioned at a bottom end of the main body;
   at least two lateral support members positioned on opposite sides of the main body, each of the at least two lateral support members including a lateral support element; and
   at least one securing member configured to be inserted between the folding table in the upright position and the seat in front of the user in order to secure the tablet computing device support to the folding table;
   wherein the bottom support element and the at least two lateral support elements are configured to receive therebetween and secure a tablet computing device to the tablet computing device support.

2. The tablet computing device support of claim 1, comprising at least two securing members, each of the at least two securing members being connected to an associated one of the at least two lateral support members.

3. The tablet computing device support of either of claims 1 or 2, wherein each of the at least two lateral support members is composed of two slidingly engaged proximal and distal sections, the proximal section being connected to the main body at one end and engaging the distal section at an opposed end, the distal section being provided with the lateral support element at an end opposite the end engaging the proximal section.

4. The tablet computing device support of either of claims 1 or 2, wherein each of the at least two lateral support members is composed of a plurality of slidingly engaging proximal and distal sections.

5. The tablet computing device support of claim 1, further comprising at least two hinges, each hinge operatively connecting a respective one each of the at least two lateral support members to the main body.

6. The tablet computing device support of claim 1, wherein the at least one securing member comprises a plurality of positioning sections.

7. The tablet computing device support of claim 6, further comprising a hinge operatively connecting adjacent pairs of the plurality of positioning sections.

8. The tablet computing device support of claim 1, wherein the at least one securing member is made of a non-rigid material.

9. The tablet computing device support of claim 7, wherein the at least one securing member is made of a non-rigid material and the hinge is a living hinge.

10. The tablet computing device support of claim 1, further comprising a spacer mechanism for inclining the tablet computing device support to a desired angle from the vertical so as to adjust a viewing angle of the supported tablet computing device.

11. The tablet computing device support of claim 10, wherein the spacer mechanism comprises a plurality of spacing portions configured so as to slidingly engage a bottom portion of the main body and abut the folding table.

12. The tablet computing device support of claim 11, further comprising a hinge operatively connecting adjacent pairs of the plurality of spacing sections.

13. The tablet computing device support of either of claims 11 or 12, wherein the at least one spacer mechanism is made of a non-rigid material.

14. The tablet computing device support of claim 13, wherein the hinge is a living hinge.

15. The tablet computing device support of claim 1, wherein at least one of the at least two lateral support elements and the bottom support element is made of a non-rigid material.

16. The tablet computing device support of claim 1, wherein at least one of the at least two lateral support elements and the bottom support element is provided with a hinge.

17. The tablet computing device support of claim 1, wherein the bottom support element is extendable.

\* \* \* \* \*